United States Patent Office 3,122,594
Patented Feb. 25, 1964

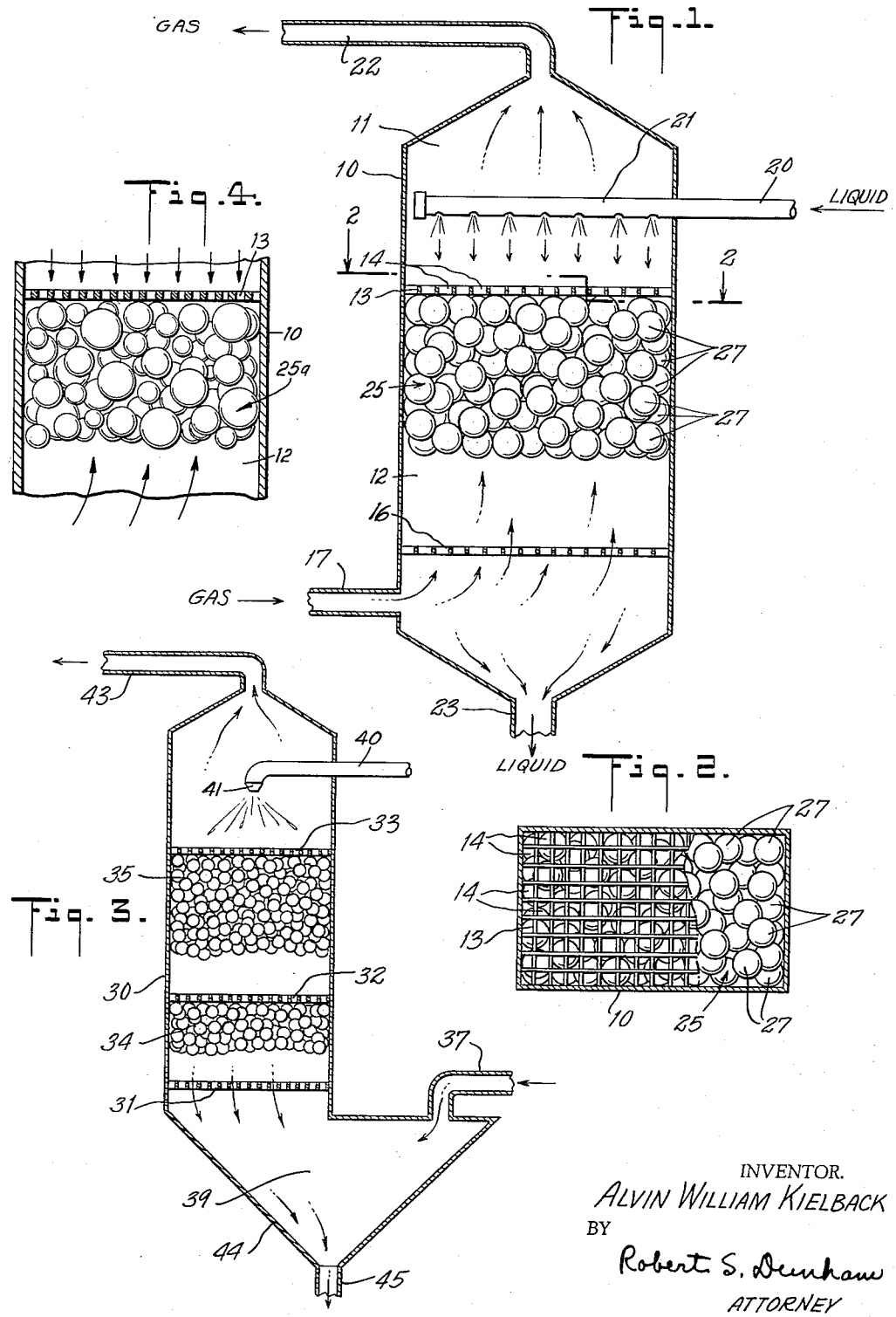

3,122,594
APPARATUS AND PROCEDURE FOR CONTACT BETWEEN FLUIDS
Alvin William Kielback, Arvida, Quebec, Canada, assignor to Aluminium Laboratories Limited, Montreal, Quebec, Canada, a corporation of Canada
Filed July 29, 1958, Ser. No. 751,663
8 Claims. (Cl. 261—94)

This invention relates to apparatus and procedure for contact between fluids, and in a more particular sense to methods and arrangements for effectuating mutual contact between gas and liquid in countercurrent flow.

A considerable variety of so-called towers or like devices have been used or proposed for various requirements of contact between different fluids, especially for such contact between gas (including vapors) and liquid arranged to travel countercurrently through the contact zone. Towers packed with various materials, such as crushed stone, granular substances, coke particles, and small rings, cylinders or other shapes of ceramic and like compositions, have been very commonly employed, with the primary function of creating a large area of surface for interphase contact between the gaseous and liquid streams, the most usual operation being the passage of liquid downward through the packing while the gas travels upwardly. Disadvantages of these devices include a frequent tendency for the gaseous and liquid streams to channel through the packing, especially at low liquid flows, and the difficulty or impossibility of preventing accumulation of solids in the voids of the packed bed when such solids are present in either or both of the streams. Alternative contact means have been proposed, in the form of multiple grids, slats or other structures of extended surface and intricate configuration, as well as other means for promoting diffusion of the gas through the liquid or special bubble-forming operations, or the like, but in at least many cases such structures failed to serve the required absorption, scrubbing or other functional requirements which are theoretically attainable with packed towers.

Efforts have also been made to avoid some of the difficulties of channeling or the like in the packing of fluid contact equipment, as by providing an agitated or otherwise moving character in the bed or its particles. For example, it has been attempted to achieve continuing movement, even a fluidization, of masses of gravel, shale, coal or coke granules or similar materials, by appropriate action of upwardly advanced gas, but such arrangements appear to be applicable at best only to some limited characteristics of flow rate, or to involve costly or difficulty controllable construction, or to be of no more than small effect in correcting the problems of packed towers.

Although the present invention is applicable to many different situations of interphase contact between fluids, e.g., countercurrent fluids of which at least one is a liquid, the problems are particularly acute in certain gas scrubbing operations, for example where large volumes of air or other gaseous mixtures coming from certain chemical or like processes are to be treated with aqueous liquid for absorption and recovery of constituents that may represent only a very minor part of the flowing gas. As will be apparent hereinbelow, the described improvements are of special advantage in these cases and their embodiment in such scrubbing or similar procedures may therefore be deemed a special feature of invention.

For the attainment of interphase contact with substantial absence of channeling and with unusual freedom from accumulation of solids, as well as for the attainment of other advantages such as will be explained, the invention involves the provision of a floating bed or packing, consisting of a multiplicity of substantially spherical elements, which may be of relatively considerable size. The fluid streams are arranged to travel through such bed, as by the countercurrent flow of gas and liquid, with the gas traveling upward and the liquid downward, while the elements of the bed are maintained in a loose or mobile assembly which floats in the upper part of the contact zone. Appropriate perforate means extend transversely of the tower or other vessel through which the fluids pass, to restrain the upward-floating spheres and to define a contact chamber below such means. This perforate partition, preferably having a large ratio of opening to solid structure, may be a perforated plate, a grid of rectangularly intersecting elements, a wide mesh screen or other suitable arrangement, all of which may be herein conveniently termed grid means, the function being to hold the floating bed while permitting the freest possible passage of the fluids.

The floating character of the bed is essential, each sphere thus having a density such that it will float in the fluid mixture, as the two fluids travel countercurrently through the contact chamber. The spherical or spheroidal elements are thus maintained in a relatively loose assembly, with sufficient mutual closeness or near-contact as to provide narrow voids, but are in such state that the elements can move slightly in various directions, and in particular are free to turn or rotate under the influence of the fluids, e.g., the ascending gas and the descending liquid. Under such circumstances it is found that unusually effective contact between the two fluids is achieved, and indeed may be obtained over a considerable range of flow rates and velocities for the fluids, with a given bed of selected density and dimensions of the elements. Channeling is essentially absent, and since the moving and free-rotating character of the spherical elements is primarily occasioned by an effect of buoyancy, the downward passage of liquid does not tend to interfere with the loose integrity of the bed or assembly, as occurs in situations where it is sought to elevate or agitate a bed of heavy particles by fluidizing or similar effects of relatively powerful gas flow. A special advantage of the process and structure is an exceptional freedom from entrapment of solid particles. Because of the freedom of the bed elements to turn or rotate, as well as the floating character of their loose assembly, solid materials carried by either gas or liquid (or both) traversing the bed are not retained, but on the contrary are carried past, e.g., being washed down with the descending liquid. Hence there is remarkable freedom from clogging and likewise from the necessity of cleaning the packing.

Further explanation of the invention may be facilitated by reference to the accompanying drawing, wherein:

FIG. 1 is a simplified and essentially schematic view (as in vertical section) of a contact tower embodying an effective form of the invention;

FIG. 2 is a section on line 2—2 of FIG. 1, showing the transverse grid means, and below a portion broken away, the contact elements;

FIG. 3 is a schematic view, as in vertical section, of another embodiment of the apparatus; and FIG. 4 is a fragmentary view, similar to FIG. 1, showing a further embodiment of the floating bed.

Referring to the example of FIGS. 1 and 2, and assuming, for instance, that the apparatus is to be used for scrubbing a gas with an aqueous liquid as for absorption of a minor proportion of soluble gaseous constituents in the liquid, the apparatus comprises a tower or vessel 10 having provision for countercurrent flow of the stated fluids. The tower may be rectangular (as shown), circular or of other suitable shape in horizontal cross-section and is of sufficient vertical extent to provide an upper discharge chamber 11 and a lower or contact chamber 12, the latter being bounded at its top by transverse grid means 13, e.g., a grid extending horizontally across the vessel 10. While it is conceived that other shapes of such grids or perforate structures, e.g., sloping or upwardly or downwardly convex, may be employed, a simple horizontal grid is found to be highly effective and indeed specially advantageous in most cases. The openings 14 in the grid are preferably as large as possible, their function being essentially only to prevent upward escape of the spherical elements, while the solid structure of the grid should be relatively thin, i.e., in a vertical direction (as by having a vertical dimension, say, less than half the side of a rectangular grid opening), to avoid a tendency, in some cases, to accelerate the gas so that the upper layer of spheres is held firmly against the grid.

A second or lower grid means 16 may be provided, if desired, being spaced below the grid means 13 by a distance substantially greater than the vertical thickness of the floating bed, for the purpose of supporting the latter when the apparatus is shut down or otherwise not in full operation.

Gas is introduced to or near the bottom or lower part of the vessel 10, i.e., at the foot of the contact chamber below the grid 16, as by a pipe 17 opening through the wall of the vessel. Liquid is similarly introduced at or near the top of the outlet chamber 11, or otherwise above the grid means 14, through a pipe 20 and preferably through a suitable distributor 21 so that a multiplicity of streams are descending or are projected downwardly toward the grid 13 and the packing, to assure distribution of the liquid over the surface of the bed. Gas and liquid are withdrawn from the vessel at appropriate localities, for instance through a gas discharge pipe 22 at the top and a liquid discharge pipe 23 at the bottom.

The packing or contact-promoting assembly, shown here as functioning in the form of a floating bed 25, consists of a large multiplicity of spheres or balls 27, sufficient in number to provide, in approximate effect, a plurality of layers, and very preferably at least several layers (such as five or six, as shown) extending entirely across the contact chamber 12. Thus the bed 25 transversely fills the chamber and has a vertical depth equaling a plurality and, with special advantage, a multiplicity of diameters of the individual elements. While in some cases it is conceived that the spheres of a given bed may differ among themselves in size or density or both (FIG. 4 being an illustration of a floating bed 25a wherein the spheres are of different sizes), it is of special convenience and advantage, and indeed thus a particular feature, to provide a packing 25 wherein the elements 27 are all of the same diameter and density. It will be understood that references to density of these spherical or spheroid elements refer to the gross density of an individual element, i.e., the weight of the element divided by its total volume. Thus the density of a hollow sphere is its weight divided by the total volume enclosed by its external surface.

The elements may be made of various materials and are conveniently hollow, thin-walled balls of plastic or synthetic resin or the like. Alternatively, other low-density constructions may be employed, such as various foamed plastics or other porous materials, with an impervious external surface. In some cases hollow or other low-density spheres of metal may be used, or conceivably inflated plastic balls, with a very thin wall, containing gas under pressure, to provide elements of extremely low density.

In operation, the scrubbing or other gas-liquid contact is effected in the illustrated apparatus by continuously supplying liquid through the pipe 20 and gas through the pipe 17. The liquid falls in sprays or advantageously in streams by force of gravity toward and through the grid means 13 and into and through the bed 25 in the contact chamber 12, finally falling or draining into the outlet pipe 23. The gas is projected from the inlet pipe 17, at a lower part of the contact chamber, so as to rise through the liquid and between the balls. Assuming that in starting up, for example, the bed of balls is resting on the lower grid 16 and the supply of liquid is initiated first, it will pass freely through the interstices between balls and drain into the outlet. When the gas is now passed upward, it crosses the falling streams of liquid (below the grid 16) and forces its way up between the balls, coming into closely effective contact with the descending liquid. More specifically, it there interferes with the downward flow of liquid, increasing the amount of liquid hold-up within the bed and correspondingly increasing the buoyancy acting on the balls.

Thus a gas-liquid mixture is in effect established in the spaces between the packing elements, causing them to float and assemble in a mobile, multi-layered manner as shown at 25, beneath the grid 13. In such position, the individual spheres 27 have the following forces acting downwardly upon them, viz. gravity (the weight of the sphere), the impact of the falling liquid, and the downward frictional drag of the liquid. Upward forces on each ball comprise the frictional lift or upward drag of the passing gas, and the buoyancy of the gas-liquid mixture which in effect surrounds the ball. It appears that in operation, the chief opposing forces are gravity and the buoyancy of the fluid mixture, or that in a general sense the forces of drag and impact may be deemed to cancel each other, whereby the floating tendency of the balls is essentially a function of their buoyancy. Under the desired floating conditions of the bed 25, the region of the chamber 12 below the bed contains the gas in continuous phase (and under pressure relative to the upper space 11), with the liquid falling through it in more or less turbulent or broken streams, to drain through the outlet 23. As stated, there is mutual dispersion and distribution of the liquid and gas in the floating bed 25, and there is ordinarily no continuous level of liquid above the grid 13, the area 11 thus containing the departing gas in continuous phase, with liquid descending through it.

The bed 25 is unrestrained at its lower boundary and as stated involves a relatively loose assembly; whereas the floating action tends to bring all of the balls into contact with each other, the downward impact and flow of the liquid and the pressure of the rising gas keep sufficient interstices between the balls for the desired travel of both fluids. The liquid in effect provides a thin film flowing over at least a large part of each ball surface, with corresponding layers or bodies of gas, mixed with liquid, between the film spheres; the gas thus turbulently ascends through all voids of the packing. An exceptionally thorough interphase contact of the fluids is achieved, over a relatively large area (substantially the total of the sphere surfaces) and with both fluids passing as thin or small bodies. At the same time, because the assembly can be regarded as truly floating in the gas-liquid mixture which fills its interstices, most or all of the balls have distinct freedom of movement, not only to a slight extent in various directions of translation, but especially in a rotating sense. This loose and mobile character of the bed effectively prevents channeling, and especially with the rotating or turning movements of the balls, inhibits any tendency of solid particles, in either the liquid or the gas, to accumulate in the interstices.

It will be understood that the operation should be controlled to avoid so-called flooding. For example, if the gas velocity is allowed to rise, in any given operation, a point may be reached where the liquid no longer flows down through the bed. In such case the upper part 11 of the tower may tend to fill with liquid, through which some of the gas may bubble upward, or indeed in some such cases the gas may build up to a certain high pressure in the chamber 12 while the accumulated liquid in the chamber above may afford an effective lock or the like, substantially arresting further passage of gas or indeed of both liquids. Where the entire region below the grid 13 becomes filled essentially with gas alone, the balls, or most of them, will tend to fall down to or toward the lower grid 16. In other words, the desired floating action is absent and the bed fails to be or remain elevated as a complete unit. Although the passing gas may have some tendency to elevate the balls partially, in a random manner (if there is any travel of gas into and through the upper chamber), the desired floating effect and distributed interphase contact of the fluids are not achieved. When such condition occurs, it can be readily corrected, e.g., by reducing the velocity or amount of gas flow until a liquid-gas mixture reappears in and substantially throughout the chamber 12 so that the balls assume their desired, floating action.

By way of specific example, the procedure and apparatus have been employed for scrubbing the gases from aluminum reduction cells (of the electrolytic type using molten baths), or the gases from the buildings, i.e., pot-rooms, where such cells or pots are operated. The scrubbing is effected with water, preferably water having a suitable chemical content to promote the desired absorption of gaseous or other material from the waste gases. That is to say, in such scrubbing operations, to which the invention is in one specific sense directed, it is usually desired to recover fluorine values, present as gaseous hydrogen fluoride and particles of solid fluorine compounds (e.g., fluorides). The gases withdrawn from the pots or pot-rooms, as by suitable pumping, contain fluorine in various amounts, as for example from 2 to 40 milligrams per cubic foot, a relatively minor proportion of the total gas. These gases also contain other solid particles, such as alumina, tars, carbon and the like, which it is desired to remove.

As stated, the fluorine in such gases is present in part as hydrogen fluoride, but also in part as solid particulate fluorine compounds, which may account for as much as 30% to 50% of the total fluorine loss from the reduction cells. At least a major portion of this solid material in the gas results from volatilization of electrolyte constituents, which condense to extremely small fume particles. Removal of these very fine particles, understood to have sizes of a fraction of a micron, has created difficulty in getting a high efficiency of recovery. Whereas hydrogen fluoride gas alone can be removed efficiently with equipment having a low pressure drop (e.g., 0.5 to 1 inch of water), such as open spray towers, satisfactory removal of fluoride fumes requires expenditure of more energy, as in higher pressure drop apparatus. The present invention is highly effective for such purpose, and is specially advantageous in that it does not become clogged with accumulations of solid material.

In one such test operation, the elements 27 were spheres (specifically, table tennis balls) of hollow, thin-walled plastic, approximately 1.5 inches in external diameter and weighing about 2.6 grams apiece, the density being thus about 5.6 pounds per cubic foot. These balls were used in a pilot tower having a horizontal cross-sectional area of 2 square feet and were employed in sufficient amount to provide a floating bed 25 of 7 inches in overall depth. The scrubbing liquid introduced above the grid 13, to strike downwardly on the floating bed, consisted of water having appropriate chemical and pH characteristics to promote absorption of hydrogen fluoride (considered as absorption of fluorine), and to discourage absorption of sulfur dioxide, which is also contained in the gases from the aluminum reduction cells. In this operation, the gas flow averaged about 850 cubic feet per minute and the flow of aqueous scrubbing liquor about 17 imperial gallons per minute. The bed 25 was effectively floated, in a relatively stable condition, beneath the grid means, for the desired dispersal and extended mutual contact of the stated fluids. The liquid was continuously withdrawn, beneath the more or less turbulent gas and liquid mixture under the bed, while the gas was drawn off at the head of the tower, all essentially as indicated in FIG. 1.

It was found that under these conditions, very high recoveries were obtained, i.e., up to 95.5%, for the desired fluoride, comprising the gaseous and solid fluorine compounds taken together. Since the absorbed hydrogen fluoride exerted a significant vapor pressure at the test conditions, this was in effect an efficiency approaching a theroetical 100%. The solids in the gas stream, considered as such and totaling about 6 milligrams per cubic foot, were reduced in proportions up to 99%, being entrained and carried away by the liquid. After 80 hours of operation, careful examination of the packing showed that the spheres were in excellent condition and entirely clean; even though a percentage of the solids were tars, and hence sticky, there was no evidence of any solids on the spheres or otherwise in the voids between them. The interphase contact effected through the bed was exceptionally satisfactory, with no indication of channeling, and as stated, with no clogging or even any apparent build-up of solids.

Specifically, the gas entered the tower at temperatures ranging from 81° C. to 93° C. and left at temperatures of 34° C. to 35° C. The gas velocity determined as inlet velocity was in the range of 400 to 450 feet per minute, with a pressure drop through the tower equal to about 3.3 inches of water head. Representative determinations of recovery of fluoride ranged from 94% to the value of 95.5% mentioned above, with considerably lower percentage removal of $SO_2$ (as desired), while solids separation ranged from 97.5 to 99% complete.

It is noted, in passing, that the apparatus can be embodied in various forms for special purposes, for instance in that the upper part 11 of the vessel may be entirely uncovered or open, as where the scrubbed gas is to be directly discharged to the atmosphere.

In another operation for scrubbing so-called pot-room gases to absorb fluoride, effective results were attained with a floating bed consisting of balls 1½ inches in diameter and having a unit weight of about 5 grams, i.e. specifically a density of about 10.5 pounds per cubic foot, where the gas velocity was of the order of 500 feet per minute. Thus whereas the lighter balls of the first example above were found preferable in aqueous gas scrubbing with lower velocities, e.g., in the order of 400 feet per minute, and indeed quite advantageously at 275 to 325 feet per minute, the test reveals that preferred results were obtained at higher velocities, say at about 475 to 525 feet per minute, with heavier balls of the same size, for example 4.5 to 5 grams each.

It appears that as the unit weight of the balls increases, while other conditions (such as gas flow and approximate ball size) remain the same, a point is reached, which may be described as a loading range, where the motion of the balls becomes relatively violent, with an extent of abrasion which may be relatively undesirable. Under such conditions, the balls may be generally described as floating, although as indicated, it is preferable that the circumstances be such as to have a relatively smooth floating action. Thus if in a given case it is desired to obtain more vigorous or thorough gas scrubbing than appears attainable with optimum floating bed action at a given ball size, tests indicate that such results are preferably attained by using a smaller ball size (with increased density if necessary), rather than simply to increase the ball weight or otherwise bring the conditions to the loading range mentioned above. It appears that there is some tendency to increased entrainment, in the gas, of liquid from the bed in such range. On the other hand, ascertainment of optimum conditions is a relatively easy matter, as by simple test, and the procedure and apparatus are readily adapted to a wide variation of gas flow velocities.

Thus as further example, it appears that with gas velocity approximating 600 feet per minute smooth floating action of the multiple layer bed is achieved with balls of 1½ inches diameter, weighing about 5.5 grams apiece.

In general, higher density of the spheres appears attainable, without impairment of the desired, superior results, as the size is decreased. For instance, it is conceived that with balls as small as ¼ inch diameter, densities up to about 15 pounds per cubic foot may be useful, where fluids such as water and air are supplied for countercurrent contact in the tower. In general, it may be said that the density of the balls for a floating bed packing may range between one pound per cubic foot to high values as indicated above, or up to about 20 pounds per cubic foot, especially with higher density fluids. It is contemplated that the ball size may be as small as about ¼ inch or as large, for practical results, as 3 inches in diameter, the use of relatively large ball sizes (say 2 or 2½ inches in diameter) being particularly suitable for very high gas velocities with reasonable liquid flows. A presently preferred ball diameter is 1 inch to 2½ inches, and a density of about 1½ to about 11 pounds per cubic foot.

As stated, the attainment of optimum results is at most a matter of simple test under any given set of conditions, the governing criterion, in most cases, being that the spherical or spheroid elements have a density lower than the density of the fluid mixture, e.g., gas and liquid, within the bed. As will be noted, in the above examples where water or like aqueous liquid was used for scrubbing a gas which was basically air or similar to air in physical properties, the density of the ball element was substantially less than the density of water, indeed substantially less than half the density of water.

The chief feature of the invention is the provision of a floating bed of generally spherical elements in loose assembly, advantageously employing a quantity of elements equivalent to a multiplicity of layers. The actual disposition of the balls is random rather than in accurately defined layers, each having at most only a limited freedom of movement in any rectilinear direction, and indeed in preferred operation having a free path no more than a minor fraction of the ball diameter, e.g., usually less than 10%. On the other hand, the loose arrangement of the balls permits free rotation, which appears to occur more or less continuously and which is understood to contribute to the unusually effective results as explained above.

While in special cases it is conceived that some desired improvement in fluid interphase contact may be achieved where the locality or directions or rates of introduction of one fluid or the other are such that one or more of the factors mentioned above (e.g., liquid or gas drag, or liquid impact) are of greater or less (or even negligible) consequence, the advantages of the invention are realized in a complete and indeed special sense where there is (as contemplated in the examples illustrated and described herein) a relatively substantial flow of liquid directed downward into the bed and through the contact chamber from above, and a flow of gas at substantial velocity upward through the chamber and bed. The relatively large number of balls then floats as a loose, slightly agitated and mobile assembly (i.e., with the individual balls turning freely) in the liquid-gas mixture in which the bed is, in effect, unified, it being understood that such mixture is a more or less turbulent composite of countercurrently traveling gas and liquid, filling the interstices of the bed. The result is an unusually efficient contact of the passing gas and liquid, over mutual surface areas of very large extent, with remarkable freedom from channeling, clogging or entrapment of solid particles.

Another example of use of the invention is in connection with the scrubbing of the tail-gas from the high temperature chlorinatoin of magnesium oxide, such operation being effected, for instance, in a vertical kiln or retort where chlorine is passed into and through a heated column of magnesia to convert it to magnesium chloride. The gas discharged from such a chlorinator contains unreacted chlorine and gaseous silicon tetrachloride (along with air, CO and $CO_2$), and also solid particles such as metal chloride, brucite and coke. In one system for treating such gas, the floating-bed procedure was employed as a precleaning stage, from which the gas was conveyed to a conventional packed scrubber, i.e., a countercurrent scrubbing tower with stationary packing, where appropriate absorbent liquor takes up the chlorine and any remaining, absorbable gaseous components.

FIG. 3 illustrates a plural-bed tower, using floating beds, as employed for the precleaning step in the described treatment of chlorinator tail-gas. Specifically, the tower shell 30 has a bottom grid 31, an intermediate grdi 32 and an upper grid 33, for correspondingly enclosing (with ample freedom of vertical movement, as in FIG. 1) two sets of balls 34, 35, similar in size and density to those first described above in connection with FIGS. 1 and 2. The gas is continuously delivered from the magnesium chloride-producing chlorinator through a pipe 37 opening into a sidewise-extended portion of a lower chamber 39 into which the bottom of the shell 30 also opens. Water used for this prescribing or precleaning operation is introduced through a pipe 40 entering the upper part of the shell 30 and having a spray nozzle 41 for projecting and distributing the water down through the upper grid 33. The cleaned gas leaves the top of the tower through a piping 43, to be processed in a chlorine-absorbing scrubber (not shown) as described above. Water streaming from the lower grid 31, carrying material removed from the gas, drains down the tapered bottom 44 of the chamber 39 to an outlet pipe 45.

It was found that the double bed arrangement of FIG. 3 functioned very effectively; each bed of balls floated in the manner explained above, under the influence of the gas traveling upward through the lower and upper beds in succession and the water descending through the beds in countercurrent order and direction. By way of example, the lower bed 34 consisted of a sufficient number of the described identical spherical elements to constitute a loose, floating assembly about 8 to 9 inches in depth, and the upper bed 35 a sufficient number of such elements to have a depth of about 18 inches. The scrubbing action was particularly satisfactory in removing the various kinds of particulate solids from the gas, and the unusual self-cleaning function of the floating beds was very evident, in exhibiting this special advantage of the invention. For instance, after 100 hours of test operation on chlorinator tail-gas, the beds of the precleaner were completely free of any accumulation of silica or other solids.

As will now be understood, the invention is adapted to embodiment with two or more floating beds in successive arrangement, for correspondingly more thorough action in certain types of service.

Another instance of the use of the invention where considerable solid material must be removed from a gas and where the self-cleaning nature of the floating bed is especially important, is in scrubbing the tail-gas from an aluminum fluoride converter. Such a converter is, for example, a vertical reactor where a moving bed of alumina, e.g., in the form of briquettes, is treated with a stream of gaseous hydrogen fluoride. The gas leaving the reactor must have its objectionable components removed before it can be released to the atmosphere. This gas, which is therefore to be scrubbed with appropriate aqueous liquor (subject to processing and recycling, with recovery of fluoride content), may contain hydrogen fluoride, gaseous silicon tetrafluoride, sulfuric acid mist, and solid particles such as alumina, aluminum fluoride and silica. In test operations for scrubbing this gas, a tower similar to that shown in FIG. 3 was used, but including only one bed of balls, about 12 inches deep when in floating assembly, and having a cross-sectional area of about one square foot.

At an operating pressure drop of about 3.0 to 3.5 inches of water, the converter tail-gas was reduced to total fluoride and silica contents of 10 mg. and 3.5 mg. per cubic foot respectively; this result can be taken to represent a scrubbing efficiency of better than 99% for these components. After 120 hours of operation, the floating packing of balls was completely free of any accumulation of silica or other solids.

Although of special advantage for gas scrubbing operations as of the character indicated above, the procedure is applicable to a considerable variety of situations of contact between a liquid and another fluid, for absorption, reaction, scrubbing, cleaning or other purposes, where a substantial proportion of each fluid is withdrawn from the contact region after traversing the bed, i.e., each fluid being thus in substantial part insoluble in the other under the circumstances of operation.

It is to be understood that the invention is not limited to the specific embodiments herein shown or described, but may be carried out in other ways without departure from its spirit.

I claim:

1. Procedure for mutual contact of gas and liquid in countercurrent flow comprising establishing upward flow of gas and downward flow of liquid through a defined contact region, while maintaining in said region a floating bed of substantially spherical elements for mutual dispersal of the passing gas and liquid between the elements thereof, and while restraining said floating bed by a perforate barrier against upward displacement above a predetermined level, the passage of the gas and liquid flows through said bed providing a fluid mixture of gas and liquid in the interstices of said bed, said elements being constituted, with a density sufficiently less than that of said liquid, to float in assembled relation in said fluid mixture and said passing flows of gas and liquid maintaining said elements in a floating, loose and mobile assembly of moving and individually rotatable elements up against said barrier, said step of maintaining the bed in floating, loose and mobile condition being effected by passing said gas upwardly to provide upward lift on the elements while maintaining downward flow of said liquid in cooperation with said upward flow of the gas to provide buoyancy of the elements, said upward lift and said buoyancy being maintained sufficient by said passage of liquid and gas to elevate the bed completely against the barrier, as such assembly.

2. Procedure as defined in claim 1, wherein the elements have a diameter in the range of about ¼ inch to about 3 inches and a density in the range of about one pound to about 20 pounds per cubic foot.

3. Procedure for mutual contact of gas and liquid in countercurrent flow comprising establishing upward flow of gas and downward flow of liquid through a defined contact region, while maintaining in said region a floating bed of at least several layers of substantially spherical elements for mutual dispersal of the passing gas and liquid between the elements thereof, and while restraining said floating bed by a perforate barrier against upward displacement above a predetermined level, and while maintaining the interstices of the floating bed filled with a mixture of the liquid and gas, said spherical elements being constituted, with a density sufficiently less than the density of the liquid, for flotation of the elements in assembled relation in said mixture of liquid and gas, and said elements being maintained in a floating, loose and mobile assembly of moving and individually rotatable elements up against said barrier by the flowing liquid and gas, said step of maintaining the bed in floating, loose and mobile condition being effected by passing said gas upwardly to provide upward lift on the elements while maintaining downward flow of said liquid in cooperation with said upward flow of the gas to provide buoyancy of the elements, said upward lift and said buoyancy being maintained sufficient by said passage of liquid and gas to elevate the bed completely against the barrier, as such assembly.

4. Procedure for scrubbing a gas with aqueous liquid in countercurrent flow, comprising projecting the aqueous liquid downward into a defined contact region from a locality above the same, to flow downwardly through and out of the region, and directing the gas upwardly through said region from a lower part thereof, to flow upwardly through and out of the region, while maintaining in said region a floating, plural-layer bed of substantially spherical elements each adapted to float and rotate in the passing liquid and gas, and while restraining said bed, as a floating, loose and mobile assembly, by a perforate barrier against upward displacement above a predetermined level, said elements being constituted, with a density sufficiently less than that of said liquid, to float in said assembled relation, and said passing gas and liquid traversing said bed and being mutually dispersed between the elements thereof, said step of maintaining the bed in floating, loose and mobile condition being effected by passing said gas upwardly to provide upward lift on the elements while maintaining downward flow of said liquid in cooperation with said upward flow of the gas to provide buoyancy of the elements, said upward lift and said buoyancy being maintained sufficient by said passage of liquid and gas to elevate the bed completely against the barrier, as such assembly.

5. Procedure as defined in claim 4 wherein the elements are balls of identical diameter selected in the range of about 1 inch to about 2½ inches and of identical density selected in the range of about 1½ pounds to about 11 pounds per cubic foot.

6. Procedure for mutual contact of gas and liquid in countercurrent flow comprising establishing upward flow of gas and downward flow of liquid through a plurality of vertically successive, defined contact regions, while maintaining in each region a floating bed of substantially spherical elements each adapted to float and rotate in the mixture of downwardly passing liquid and upwardly passing gas permeating each bed, and while restraining each of said beds, as a floating, loose and mobile assembly, by a perforate barrier against upward displacement above a predetermined level, said elements being constituted, with a density sufficiently less than that of said liquid, to float in said assembled relation, and said passing liquid and gas traversing the beds in respectively opposite succession and being mutually dispersed between the elements of each bed, said step of maintaining the beds in floating, loose and mobile condition being effected by passing said gas upwardly to provide upward lift on the elements while maintaining downward flow of said liquid in cooperation with said upward flow of the gas to provide buoyancy of the elements, said upward lift and said buoyancy being maintained sufficient by said passage of liquid and gas to elevate the beds completely against the respective barriers, as such assemblies.

7. Procedure as defined in claim 1 in which the spherical elements of the bed differ among themselves in size.

8. Procedure as defined in claim 1 in which the spherical elements of the bed differ among themselves in density.

References Cited in the file of this patent

UNITED STATES PATENTS

| | | |
|---|---|---|
| 2,253,261 | Bacon | Aug. 19, 1941 |
| 2,400,810 | Clark et al. | May 21, 1946 |
| 2,431,455 | Blanding | Nov. 25, 1947 |